May 31, 1938.  J. ROHNFELD  2,119,115
MICA CONDENSER
Filed Nov. 8, 1934
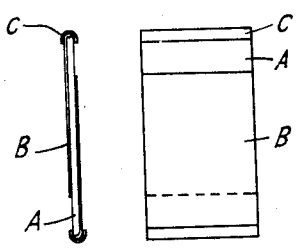
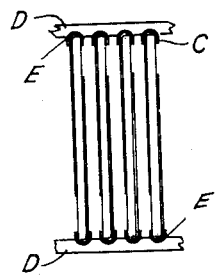
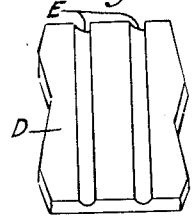
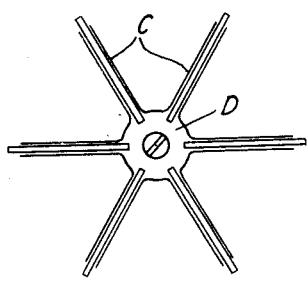
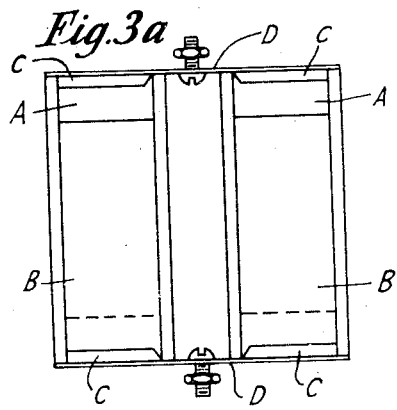
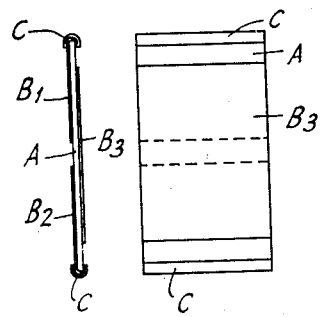
INVENTOR
JOHANNES ROHNFELD
BY
ATTORNEY Patented May 31, 1938

2,119,115

UNITED STATES PATENT OFFICE 2,119,115

MICA CONDENSER

Johannes Rohnfeld, Berlin, Germany, assignor to Telefunken Gesellschaft für Drahtlose Telegraphie m. b. H., Berlin, Germany, a corporation of Germany Application November 8, 1934, Serial No. 752,079
In Germany November 9, 1933

9 Claims. (Cl. 175—41)

This invention relates to an improved mica electric condenser comprising mica foil or laminations serving to support metallic coats.

Condensers adapted to relatively high reactance loads are often so constructed that mica laminations and metallic coats are stratified to form piles, stacks or packets, with the latter being subjected to mechanical pressure. The pressure must be high in order that an intimate dielectric contact may be insured between the mica lamination and the metallic coat. This form of construction is simplified by the use of mica sheets which themselves constitute the supports for the metallic coats, say, mica sheets upon which the coats are applied by spraying or by pasting. The pressure in this case needs to be chosen only high enough in order that mechanical cohesion of the mica sheets supporting the coats may be insured.

The advantage of stratified and highly compressed condenser stacks or packets consists in simple mechanical design and reduced space requirements. The disadvantage of this type of condenser inheres in the poor abduction of the heat dissipated inside the packet or pile, and the drawback residing in this condenser is so much more serious if the coats consist of sprayed metal layers which must be kept very thin if scaling or detaching of the coats is to be precluded.

Now, in the present invention a mica condenser is disclosed wherein the mica leaves themselves serve as supports for the coats, and which is free from the disadvantages before mentioned. As a matter of fact, in the condenser of this invention stratification and compressing of the mica foils bearing the coats are entirely dispensed with. The condensers are so assembled with coat-carrying mica sheets that both faces of each constituent sheet are in perfect contact with the cooling means, the latter being either gaseous, liquid, or solid. The load-carrying capacity of each individual mica sheet is thus raised to several times that which can be safely carried by stratified assemblies.

Conduction of current to the coats of this invention is advantageously effected by the aid of metal strips which are squeezed around two opposite edges of the coat-carrying mica sheet. While reinforcement of the coat below the contact point or soldering between coat and connecting sheet for further improvement of the contact is possible, it is not indispensable.

A number of exemplified embodiments of the condenser according to the present invention is illustrated in the attached drawing in which Fig. 1 shows an end elevation of a simple condenser of this invention;
Fig. 1a is a front elevation of Fig. 1;
Fig. 2 illustrates an end elevation showing a plurality of condenser units;
Fig. 2a is a detail of the condenser support shown in Fig. 2;
Fig. 3 shows a plan view of a star shaped condenser arrangement;
Fig. 3a is an elevation of Fig. 3;
Fig. 4 illustrates an end elevation of a modification of Fig. 1;
Fig. 4a is a front elevation of Fig. 4.

Referring now to Figs. 1 and 1a, each completely and perfectly cooled element of the condenser consists of a mica sheet A, metallic coats BB (applied preferably by a die-cast process or electrolytically), and metal strip connector or terminal sheets C. The mica sheets A have metallic coats BB located on each surface and as shown in Fig. 1, there is an end margin of uncoated mica, the end margins of the two mica surfaces being arranged so that the end margin of uncoated mica on one surface is located at an opposite end with respect to the other surface. In Figs. 2 and 2a the condenser comprises a plurality of such units or constituents of Figs. 1 and 1a, the terminal strip C and holding means or mounting frames D having a plurality of grooves E at each end forming parts of a mounting frame.

As illustrated by Figs. 3 and 3a, the mounting frames D, together with their holding sheets C, are formed star-fashion; this form of construction offers the advantage of symmetry.

Figs. 4 and 4a illustrate a mica foil or sheet which has more than two coats, but of these only the coats marked B1 and B2 have connections, while coat B3 located on the opposite sides of coats B1 and B2, as known in the art, serves solely for capacitive series connection of the remainder of the coats. The voltage in the case of a condenser unit of this type may be raised to twice what it is for condensers with two coats.

I claim:
1. A sheet condenser comprising a plurality of insulating sheets, each insulating sheet acting as a dielectric and a support for a plurality of metallic coatings located on the two surfaces of said insulating sheets, the ends of said sheets having a metallic terminal strip pressed around each end edge of the insulating sheet and each in contact with a metallic coating, a mounting frame located at each end of said insulating sheets, and fastening means for securing each mounting frame to said metallic terminal strips.

2. A sheet condenser comprising a plurality of insulating sheets, each insulating sheet acting as a dielectric and a support for a plurality of metallic coatings located on the two surfaces of said sheets, the ends of said sheets having a metallic terminal strip pressed around each end edge of the insulating sheet and each in contact with a metallic coating and fastened thereto, a mounting frame located at each end of said insulating sheets, and fastening means for securing each mounting frame to said metallic terminal strips.

3. A sheet condenser comprising a plurality of insulating sheets, each insulating sheet acting as a dielectric and a support for a plurality of metallic die cast coatings located on the two surfaces of said insulating sheets, the ends of said sheets having a metallic terminal strip pressed around each end edge of the insulating sheet and each in contact with a metallic die cast coating, a star-like mounting frame located at each end of said insulating sheets, and fastening means for securing each mounting frame to said metallic terminal strips.

4. A mica sheet condenser comprising a plurality of mica sheets, each mica sheet acting as a support for a plurality of metallic coatings located on the two surfaces of said mica sheet, the ends of said sheets having a metallic terminal strip pressed around each end edge of the mica sheet and each in contact with a coating, a star-like mounting frame located at each end of said mica sheets, and fastening means for securing each star-like mounting frame to said metallic terminal strips.

5. A mica sheet condenser comprising a plurality of mica sheets, each mica sheet acting as a support for a plurality of metallic coatings located on the two surfaces of said mica sheet, the ends of said sheets having a metallic terminal strip pressed around each end edge of said mica sheet and each in contact with a coating, a star-like mounting frame located at each end of said mica sheets, fastening means for securing each star-like mounting frame to said metallic terminal strips, and a terminal screw located in the center of each star-like mounting frame.

6. A mica sheet condenser comprising a plurality of mica sheets, each mica sheet acting as a support for a plurality of metallic die cast coatings located on the two surfaces of said mica sheet, the ends of said sheets having a metallic terminal strip pressed around each end edge of the mica sheet and each in contact with a coating, a mounting frame located at each end of said mica sheets, and fastening means for securing each mounting frame to said metallic terminal strips.

7. A mica sheet condenser comprising a plurality of mica sheets, each mica sheet acting as a support for a plurality of metallic die cast coatings located on the two surfaces of said mica sheet, the ends of said sheets having a metallic terminal strip pressed around each end edge of the mica sheet and each in contact with a coating and soldered thereto, a mounting frame located at each end of said mica sheets, and fastening means for securing each mounting frame to said metallic terminal strips.

8. A mica sheet condenser comprising a plurality of mica sheets, each mica sheet acting as a support for a plurality of metallic coatings located on the two surfaces of said mica sheet, the ends of said sheets having a metallic terminal strip pressed around each end edge of the mica sheet and each in contact with a coating, a mounting frame comprising a hub member with a plurality of outwardly extending radial spokes located at each end of said mica sheets, and fastening means for securing each mounting frame to the metallic terminal strips.

9. A mica sheet condenser comprising a plurality of mica sheets, each mica sheet acting as a support for a plurality of metallic coatings located on the two surfaces of said mica sheet, the ends of said sheets having a metallic terminal strip pressed around each end edge of the mica sheet and each in contact with a coating, a mounting frame comprising a hub member with a plurality of outwardly extending radial spokes located at each end of said mica sheets, fastening means for securing each mounting frame to the metallic terminal strips, and terminal means located in the hub portion of each mounting frame.

JOHANNES ROHNFELD.